United States Patent
Ono et al.

(10) Patent No.: US 6,274,846 B1
(45) Date of Patent: Aug. 14, 2001

(54) BELT CONVEYING APPARATUS AND IMAGE FORMING APPARATUS

(75) Inventors: Tsukasa Ono, Kanagawa; Masaaki Tomimizu, Saitama, both of (JP)

(73) Assignees: Fuji Photo Film Co., Ltd., Kanagawa; Fuji Photo Optical Co., Ltd., Saitama, both of (JP)

( * ) Notice: Subject to any disclaimer, the term of this patent is extended or adjusted under 35 U.S.C. 154(b) by 0 days.

(21) Appl. No.: 09/514,201

(22) Filed: Feb. 25, 2000

(30) Foreign Application Priority Data

Feb. 26, 1999  (JP) .................................................. 11-049883

(51) Int. Cl.[7] ........................... B65G 23/44; B65G 39/16; B65H 5/02; G03D 13/00; G03G 15/20
(52) U.S. Cl. .......................... 219/216; 219/469; 399/165; 198/808; 198/816
(58) Field of Search ..................................... 219/216, 469; 399/165, 303, 313, 329; 198/806–808, 813, 816

(56) References Cited

U.S. PATENT DOCUMENTS

| | | | | |
|---|---|---|---|---|
| 2,570,364 | * | 10/1951 | Mercier ................................ | 198/808 |
| 2,892,534 | * | 6/1959 | Ogden ................................. | 198/808 |
| 5,052,547 | * | 10/1991 | Doi ..................................... | 198/806 |
| 5,659,851 | * | 8/1997 | Moe et al. ........................... | 399/165 |
| 5,988,362 | * | 11/1999 | Nakamura et al. ................... | 198/816 |
| 6,078,766 | * | 6/2000 | Kurotaka ............................. | 399/165 |
| 6,125,994 | * | 10/2000 | Todome .............................. | 198/806 |

FOREIGN PATENT DOCUMENTS

| | | | |
|---|---|---|---|
| 8-234597 | * | 9/1996 | (JP) . |
| 8-292668 | * | 11/1996 | (JP) . |
| 10-227342 | * | 8/1998 | (JP) . |
| 11-91978 | * | 4/1999 | (JP) . |

\* cited by examiner

*Primary Examiner*—Joseph Pelham
(74) *Attorney, Agent, or Firm*—Sughrue, Mion, Zinn, Macpeak & Seas, PLLC (57) ABSTRACT

During an initial setting period, if there is a tendency for a belt to move sideways due to tolerance when components are assembled in the initial setting, inclination in the axial direction of a driven roller can be changed after the components are assembled, to adjust degree of tension at both end portions in the transverse direction of the belt wound at a driven roller. Accordingly, the tendency for the belt to move sideways caused during assembly of the components can be corrected. Further, when there are changes over time (reduced elasticity of the belt, changes in the positioned state of rollers, or the like), sideways movement may occur during operation. However, in these cases, since a tapered auxiliary roller is attached at each of end portions in the axial direction of the rollers so as to be able to rotate relatively to the respective roller that is the base body thereof, when the belt moves sideways onto the auxiliary rollers the belt can be promptly returned to its original position.

20 Claims, 6 Drawing Sheets

BELT CONVEYING APPARATUS AND IMAGE FORMING APPARATUS

BACKGROUND OF THE INVENTION

1. Field of the Invention

The present invention relates to a belt conveying apparatus in which a belt entrained about a plurality of rollers is rotated by receiving a rotational driving force imparted by at least one driving roller, and to an image forming apparatus in which a photosensitive material and an image receiving material are superposed on each other and heat developed in a heat developing processing section of the apparatus.

2. Description of the Related Art

An image forming apparatus is proposed which records an image on a photosensitive material, carries out thermal developing processing in a state in which the photosensitive material having an image recorded thereon and an image receiving material are superimposed, and transfers the image to an image receiving material.

In the thermal developing processing, the two sheet materials, which are formed by laminating the photosensitive material and the image receiving material in the presence of an image forming solvent (for example, water), are wound about the circumferential surface of a heating drum, and are then conveyed while being held by a belt. The heating drum is provided with a halogen lamp, as a heating source, in a shaft core thereof. Heat generated when the halogen lamp is lit heats the circumferential surface of the heating drum. The photosensitive material and the image receiving material undergoes thermal development transfer processing due to this heat, so that an image on the photosensitive material is transferred to the image receiving material.

The belt is entrained about a plurality of rollers. One roller among the plurality of rollers is a driving roller. The belt circles about the plurality of rollers in synchronism with rotational speed of the heating drum, due to rotational driving force of the driving roller. The problem of the belt moving sideways as it is conveyed about the plurality of rollers cannot be ignored. The image forming apparatus is for originals of a comparatively large size (for example, 841 mm×1189 mm, or 728 mm×1030 mm) and width of the belt has become larger in accordance with the size of the original. The amount the belt moves sideways during conveyance increases as the transverse dimension of the belt increases. This sideways movement is caused by the flatness of the circumferential surface of the rollers about which the belt is entrained (the rollers have the same radius throughout in the axial direction).

As a result, it has been proposed to make each of the driven rollers, which are the rollers other than the driving roller, in a trapezoidal form, by tapering a portion in a vicinity of both ends in the axial direction thereof (for an example, refer to Japanese Patent Application Laid-Open (JP-A) No. 2-66036). Due to this structure, the belt that moves sideways onto the tapered portions increases in speed, since the tapered portions have an increased linear speed due to an increased diameter. As a result, the belt returns to its original position. Accordingly, sideways movement is prevented from worsening.

However, with the above-described prior art, since the tapered portions and the driven roller that is the base body for the tapered portions rotate integrally, the force apt to move the belt sideways and the force apt to reverse the sideways movement may balance each other. As a result, even if sustained sideways movement is not caused, the belt moves in the transverse direction at certain positions, which causes the photosensitive material and the image receiving material to become out of registration. At this time, uneven transfer occurs, which reduces image quality.

In the prior art, there is disclosed a technology wherein, in cases where sideways movement occurs, positions of both ends of some of the driven rollers are independently adjusted in the axial direction. Namely, by inclining the axial line of the driven roller in the direction opposite to the direction of the sideways movement, the sideways movement can be reversed.

However, since the direction of inclination is also inclined such that the axial line is inclined in the direction the belt is conveyed, excessive torsion takes place and the belt may form slack. Due to this slack, force holding the photosensitive material and the image receiving material varies across the transverse direction thereof, and uneven transfer may occur as a result.

SUMMARY OF THE INVENTION

In light of the above-described circumstances, an object of the present invention is to achieve a belt conveying apparatus wherein, when the belt moves sideways, the belt can be returned to its original position easily.

Another object of the present invention is to achieve a belt conveying apparatus that can inhibit sideways movement by setting inclination of a driven roller so as to prevent the belt from moving sideways.

Still another object of the present invention is to achieve a belt conveying apparatus in which, in cases where an image on an photosensitive material is transferred to an image receiving material by heating the photosensitive material and the image receiving material in a state in which they are laminated together, reduction of image quality can be inhibited by preventing uneven transfer caused by the belt moving sideways.

A first aspect of the present invention is a belt conveying apparatus for rotating a belt entrained on a plurality of rollers, comprising: at least one driving roller among the plurality of rollers, for imparting rotational driving force to the belt; at least one driven roller among the plurality of rollers, which does not impart rotational driving force to the belt; auxiliary rollers attached to the at least one driven roller, which driven roller is a base body thereof, so as to be able to undergo rotation relative to the driven roller, the diameter of each of the auxiliary rollers gradually increasing from an end portion of the auxiliary roller at an end portion of the driven roller towards the other end portion of the auxiliary roller in the axial direction.

According to the first aspect, the auxiliary roller is provided at each of two ends of the driven roller in the axial direction. The auxiliary roller is in a tapered from and rotates relatively to the driven roller, which is the base body of the auxiliary roller. Accordingly, the auxiliary roller is rotated by the conveying force of the belt when the belt reaches the auxiliary roller (namely, when the belt moves sideways). At this time, since the auxiliary roller is in the in the tapered form, linear speeds of portions in the axial direction differ from each other. The closer to the outer side of the auxiliary roller, the faster the linear speed of the roller. Therefore, the belt is easily returned to its original position. Namely, the auxiliary roller rotates irrespective of rotation of the driven roller that is the base body thereof and rotates only by conveying force of the belt. Accordingly, the drawback in which the force moving the belt sideways and the force returning the belt to its original position equally balance each other such that the belt is maintained in a displaced state is avoided.

A second aspect of the present invention is a belt conveying apparatus for rotating a belt entrained on a plurality of rollers, comprising: at least one driving roller among the plurality of rollers, for imparting rotational driving force to the belt; at least one driven roller among the plurality of rollers, which does not impart rotational driving force to the belt; a driven roller-miving mechanism, which allows two end portions of the driven roller in the axial direction to move independently from each other in a direction perpendicular to a rotational axis of the driven roller and along a line connecting a center point of a wound dimension of the belt wound on the driven roller and the rotational axis of the driven roller; and a positioning—and fixing-mechanism, for positioning and fixing beforehand both end portions of the belt in the axial direction at respedtive positions at which sideways movement of the belt is inhibited.

According to the second aspect of the present invention, at least one of the driven rollers can be moved by the driven roller-moving mechanism. The direction of movement in a direction perpendicular to a rotational axis of the driven roller and along a line connecting a center contact point of a wound dimension of the belt wound on the driven roller and the rotational axis of the driven roller. Namely, in a case in which the belt is entrained at the circumferential surface of the rollers, the direction of movement is the direction of a line connecting the rotation axis of the driven roller and a position at an angle that is half of the angle between a winding start position and a winding end position. In a case in which the belt is conveyed in a straight line tangential to the driven roller, the direction of movement is the direction of a line connecting the rotational axis of the driven roller and the contact point of the tangential line.

With the driven roller being moved in this direction, the driven roller is not inclined with respect to the direction in which the belt is conveyed, and only the tension of the belt is changed. Namely, the fact that the belt moves from a position of low tension to a position of high tension is clear since the belt moves in a direction towards the center of the axial line of the roller. This moving force acts on the belt easily.

Accordingly, the driven roller-moving mechanism executes movement such that the tension of the end portion opposite to the direction of sideways movement is increased, and this position is fixed by the positioning- and fixing-mechanism. As a result, sideways movement is eliminated.

A third aspect of the present invention an image-forming apparatus for forming an image on an image receiving material, by heating a photosensitive material upon which an image is recorded and the image receiving material to which the image recorded on the photosensitive material is to be transferred, which photosensitive material and image receiving material have been laminated together in presence of a solvent for image formation, thereby transferring the image on the photosensitive material to the image receiving material, the image forming apparatus comprising: a heating drum at whose circumferential surface the photosensitive material and the image receiving material which have been laminated together are wound, the circumferential surface of the heating drum being heated by heat from a heating source; an endless belt for holding against the heating drum the photosensitive material and the image receiving material which have been laminated together, by moving along a portion of the circumferential surface of the heating drum as a portion of a conveying path, the endless belt being entrained and rotated at a plurality of rollers at a position including both end portions of the portion of the circumferential surface of the heating drum and at a different position from the position of the portion of the conveying path; at least one driving roller among the plurality of rollers, for imparting rotational driving force to the belt; at least one driven roller among the plurality of rollers, which does not impart rotational driving force to the belt; auxiliary rollers attached to the at least one driven roller, which driven roller is a base body thereof, at two positions further outward than two transverse direction end portions of the entrained belt so as to be able to undergo rotation relative to the driven roller, the diameter of each of the auxiliary rollers gradually increasing from an end portion of the auxiliary roller at a transverse direction end portion of the belt when the belt is in a normal position towards the other end portion of the auxiliary roller in the axial direction.

In the third aspect of the present invention, the first aspect is applied as a belt in a thermal developing transfer section of the image forming apparatus. By preventing sideways movement, uneven transfer is prevented, and it is possible to inhibit reduction of image quality. of the driven roller and along a line connecting a center contact point of a wound dimension of the belt wound on the driven roller and the rotational axis of the driven roller; and a positioning- and fixing-mechanism, for positioning and fixing the two end portions of the driven roller in the axial direction at respective positions at which sideways movement of the belt is inhibited.

In the fourth aspect of the present invention, the second aspect is applied as a belt in a thermal developing transfer section of the image forming apparatus. By preventing sideways movement, uneven transfer is prevented, and it is possible to inhibit reduction of image quality.

Further, the first and third aspects are premised on returning the belt to its original position after the belt moves sideways. In contrast, the second and fourth aspects are premised on preventing the belt from moving ideways.

It is clear that each of these aspects may effectively inhibit sideways movement separately. When they (i.e., the first and second aspects, or the third and fourth aspects) are combined, a sideways movement-inhibiting effect can be maintained over a long period. Namely, sideways movement is not only prevented, but in cases in which sideways movement occurs due to changes over time (reduction in elasticity of the belt, changes in the resistance force of the driven roller to rotation, or the like), the sideways movement can be corrected promptly.

DESCRIPTION OF THE PREFERRED EMBODIMENTS

Figure 1:
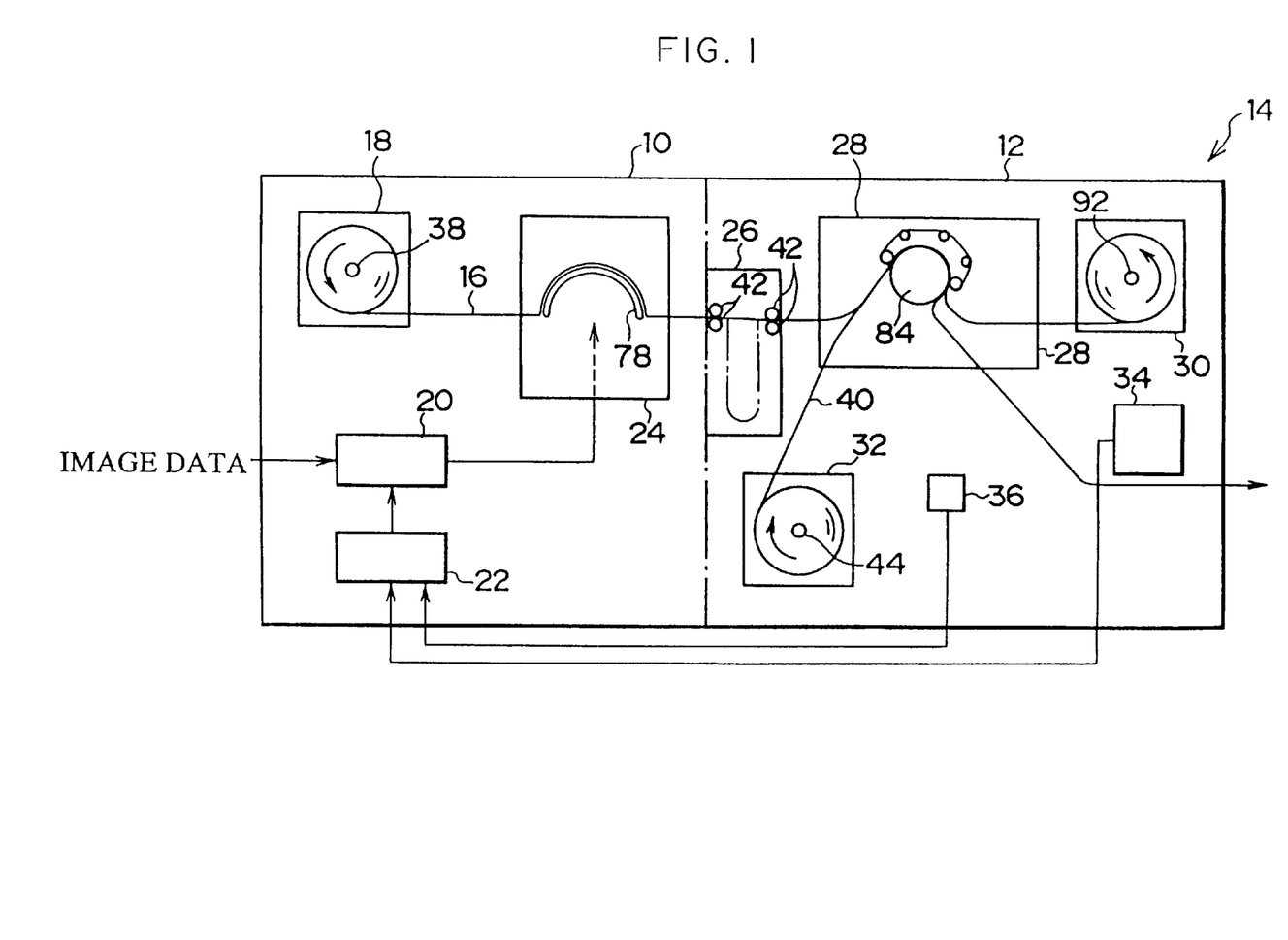
FIG. 1 is a schematic structural view of an image forming apparatus according to the present embodiment.

In FIG. 1, an image forming apparatus 14 according to the present invention is shown.

The image forming apparatus 14 is structured by an image exposure device 10 and an image processing device 12.

The image exposure device 10 is structured so as to include a photosensitive material loading section 18, a correction circuit 20, a correction data generating section 22, and an exposure unit 24. Further, the image processing device is structured so as to include a face section 26, a thermal development unit 28, a photosensitive material take-up section 30, an image receiving material feeding- and loading-section 32, a color measuring sensor 34, and a temperature- and humidity-sensor 36.

The photosensitive material loading section 18 of the image exposure device 10 loads a photosensitive material 16 taken up by a take-up shaft 38. The photosensitive material 16 that has been loaded into the photosensitive material loading section 18 is conveyed in a predetermined direction due to driving of conveying rollers (not shown). The exposure unit 24 is disposed downstream in the direction the photosensitive material 16 is conveyed. An output end of the correction circuit 20, which correction circuit 20 corrects image data, is connected to the exposure unit 24. Corrected image data generated by the correction circuit 20 is inputted into the exposure unit 24. Namely, at the exposure unit 24, instructions are given to drive a laser (not shown) based on the corrected image data, and light beams are used to scan and thereby expose the photosensitive material 16. Further, a drum 78 in the form of an arc whose central angle is substantially 180° is disposed in the exposure unit 24. The photosensitive material 16 is wound along an inner circumferential surface of the drum 78 and conveyed, and light beams are irradiated onto the photosensitive material 16 from the inner circumferential direction of the drum 78. This structure is known as an inner spinner type (details of this structure will be provided later).

In the correction circuit 20, an output end of the correction data generating section 22 is connected. An output end of the color measuring sensor 34 and the temperature/humidity sensor 36, which are disposed at the image processing device 12, are connected to the correction data generating section 22. The temperature/humidity sensor 36 is a sensor for detecting the temperature and humidity inside the image processing device 12. The color measuring sensor 34 is a sensor that measures color of an image recorded on an image receiving paper 40 that has been subjected to thermal developing processing with the thermal development unit 28. Accordingly, based on data detected (measured) by the temperature/humidity sensor 36 and the color measuring sensor 34, the correction data generating section 22 generates correction data used when correcting image data in the correction circuit 20.

Next, an internal structure of the image processing device 12 disposed next to the image exposure device 10 will be described in detail, while referring to FIG. 2.

Figure 2:
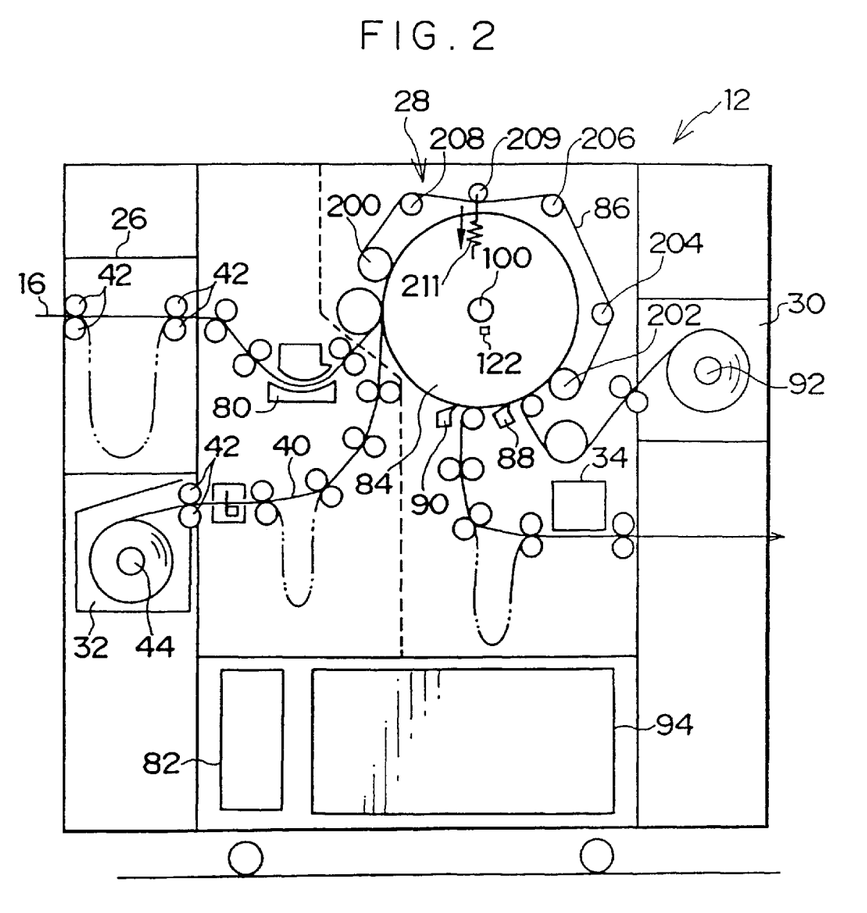
FIG. 2 is a schematic structural view of an image processing device, which structures a portion of the image forming apparatus.

As shown in FIG. 2, in a vicinity of a connecting portion of the image processing device 12 and the image exposure device 10, the face section 26 is disposed. A branch guide (not shown) operated by a solenoid is disposed at the face section 26. The branch guide can switch between a horizontal state and a vertical state. When switched to the vertical state, the photosensitive material 16 can be made slack between conveying rollers 42, as shown by the double-dashed chain line in FIG. 2. As a result, the speed difference between the processing speed of the image processing device 12 and the processing speed of the image exposure device 10 can be adjusted. Further, driving of the conveying rollers 42 is controlled by a controlling unit 94 disposed at a lower side of the image processing device 12.

At a lower side of the face section 26, the image receiving material feeding- and loading-section 32 is disposed. At the image receiving material feeding- and loading-section 32, the image receiving paper 40 taken up by a take-up shaft 44 is loaded, and the image receiving paper 40 is conveyed in a predetermined direction by conveying rollers 42.

The thermal development unit 28 is disposed at a position downstream in the direction the photosensitive material 16 is conveyed. A water application section 80, in which water as the image forming solvent for the photosensitive material 16 is filled, is provided at the thermal development unit 28.

Water is supplied to this water application section 80 from a water tank 82 provided at a lower portion of the image processing device 12, by using a pump (not shown). By applying water to the photosensitive material 16, the image receiving paper 40 and the photosensitive material 16 can be better adhered to each other when they are laminated together.

In addition to the water application section 80, a heating drum 84 is also disposed at the thermal development unit 28. A heater 100 is contained at an internal portion of the heating drum 84. The temperature of the heater 100 rises as the heating drum 84 is rotated. Further, a temperature sensor 122 is attached to this heater 100.

Halogen lamps are used as this heater 100. The halogen lamps are arranged around the center of the heating drum 84 at an even pitch within a range of a predetermined angle. Lighting and extinguishing the halogen lamps control the surface temperature of the heating drum 84.

With this structure, the photosensitive material 16 and the image receiving paper 40 are heated for a predetermined time (namely, thermal developing processing is carried out) as they are conveyed along the outer circumferential surface of the heating drum 84. Further, a belt 86 for preventing slippage is disposed on the outer periphery of the heating drum 84. The belt 86 prevents the photosensitive material 16 and the image receiving paper 40 from slipping as they are conveyed along the circumferential surface of the heating drum 84, and is structured in consideration of accurate image formation on the image receiving paper 40.

At respective positions at the heating drum 84 that are downstream in the direction to which the photosensitive material 16 and the image receiving paper 40 are conveyed, a photosensitive material-stripping member 88 and an image receiving paper-stripping member 90 are disposed. The photosensitive material-stripping member 88 is for stripping the photosensitive material 16, which has been laminated to the image receiving paper 40. The image receiving paper-stripping member 90 is for stripping the image receiving paper 40 from the heating drum 84.

The photosensitive material 16, which has been stripped from the image receiving paper 40 by the photosensitive material-stripping member 88, is taken up by a take-up shaft 92 provided in the photosensitive material take-up section 30, and is disposed of as waste. The color measuring sensor 34 is disposed at a position downstream in the direction for conveying the image receiving paper 40, which has been stripped from the heating drum 84 by the image receiving paper-stripping member 90 and which has an image formed thereon. The color measuring sensor 34 measures color of the image formed on the image receiving paper 40, and outputs measurement data to the correction data generating section 22, which is disposed at the image exposure device 10. The image receiving paper 40, whose color has been measured by the color measuring sensor 34, is discharged from the image processing device 12.

Figure 3:
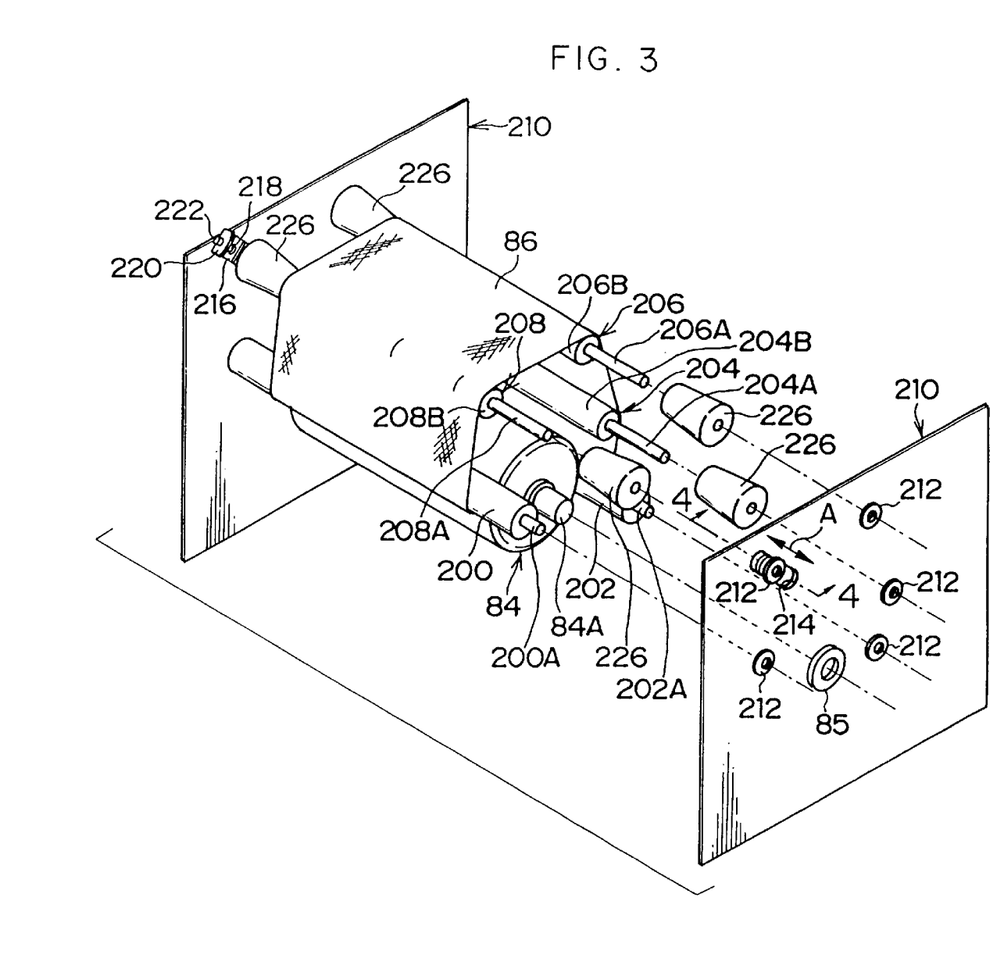
FIG. 3 is an exploded perspective view of a thermal developing unit.

As shown in FIG. 3, the belt 86 is wound about a plurality (in the present embodiment, 5) of rollers 200, 202, 204, 206, 208 (below, when referring to these rollers as a group, they will be called "roller group"). Two of these rollers, the rollers 200 and 222, are disposed at positions at the heating drum 84 at which winding of the photosensitive material 16 and the image receiving paper 40 begins and ends, respectively. The path for conveying the belt 86 between the rollers 200, 202 follows along the circumferential surface of the heating drum 84 in an arc form. As shown in FIG. 2, a tension roller 209 (not shown in FIG. 3) is separately provided so as to contact the belt 86. Urging means (a tension coil spring or the like) 211 are provided at both end portions of the tension roller 209 in the axial direction thereof. The urging means 211 are for moving the tension roller 209 in the direction in which the tension roller 209 approaches the heating drum 84. The tension roller 209 has a function of applying an appropriate degree of tension to the belt 86. Further, instead of providing the tension roller 209 separately, any of the rollers 204, 206, and 208 may be made to serve as a tension roller.

The conveyance path of the belt 86, except for the conveyance path of the belt 86 forming an arc form, is arranged in a straight path between two of these rollers (the rollers 202 and 204, the rollers 204 and 206, the rollers 206 and 208, the rollers 208 and 200, respectively).

Among the roller group, one of the rollers is a driving roller that rotates due to driving force of driving means (not shown). In the present embodiment, the roller 202, which is disposed at the position at which winding of the photosensitive material 16 and the image receiving paper 40 ends, is the driving roller. Further, the rollers other than this driving roller are each a driven roller that does not have driving force independently. A structure may be adopted wherein all of the rollers are driven rollers, and a roller, a sprocket, a pulley, or the like is disposed, for imparting driving force directly to the belt by contacting the inner or outer periphery of the belt.

Here, in the present embodiment, the dimension of the belt 86 in the direction the belt 86 is conveyed and the dimension of the belt 86 in the transverse dimension are set so as to have the following relationship.

Figure 7:
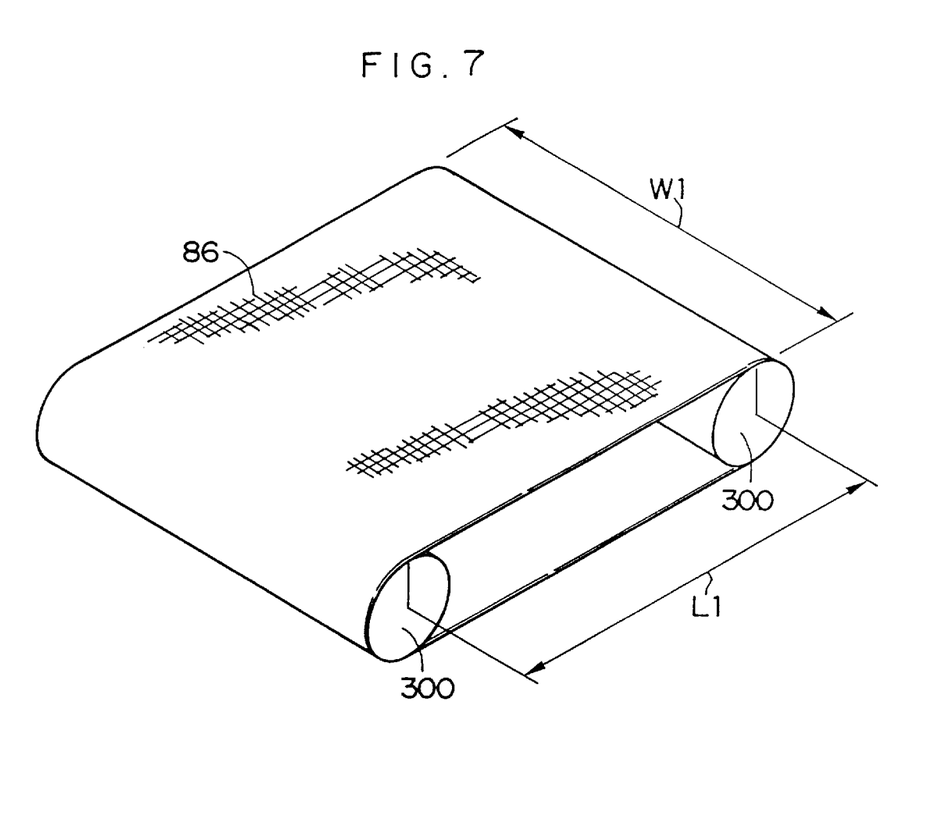
FIG. 7 is a perspective view showing a case in which the belt is entrained between a pair of rollers, to determine the dimensions of the belt.

Namely, as shown in FIG. 7, when the belt 86 is entrained in a loop form about a pair of rollers 300 (the rollers 300 are a device for determining the dimensions of the belt 86, and are not a part of the actual apparatus), the belt 86 is in form of a field track (a pair of linear portions connected by a pair of arc portions). The length L1 of the linear portion is substantially equal to the width W1 of the belt 86 (L1≈W1±α, α=approximately 20% of L1). Further, in the present embodiment, based on a relationship with the dimensions of the outer form of the heating drum 84, L1=1000 mm, and W1=800 mm. By maintaining this relationship, sideways movement of the belt 86 can be kept to a minimum.

As shown in FIG. 3, each of rotational shafts of the rollers in the roller group, i.e., rotational shafts 200A, 202A, 204A, 206A, and 208A, is disposed to extend between a pair of parallel side plates 210, via bearings 212. The heating drum 84 is also disposed to extend between the side plates 210. The rotational shaft 84A of the heating drum 84 is axially supported at the side plates 210 via bearings 85.

The roller 208 is positioned above the roller 200, which is positioned where winding of the photosensitive material 16 and the image receiving paper 40 on the heating drum 84 begins. Holes at which of the bearings 212 for the shaft 208A of the roller 208 are mounted to the side plates 210 are elongated holes 214. The longitudinal direction of the elongated holes 214 (directions of arrow A in FIGS. 3, 4) corresponds to a direction perpendicular to the rotational axis of the roller 208 and along a line connecting the center contact point of the wound dimension of the belt 86 wound on the roller 208 and the axial line or the rotational axis of the roller 208.

Figure 4:
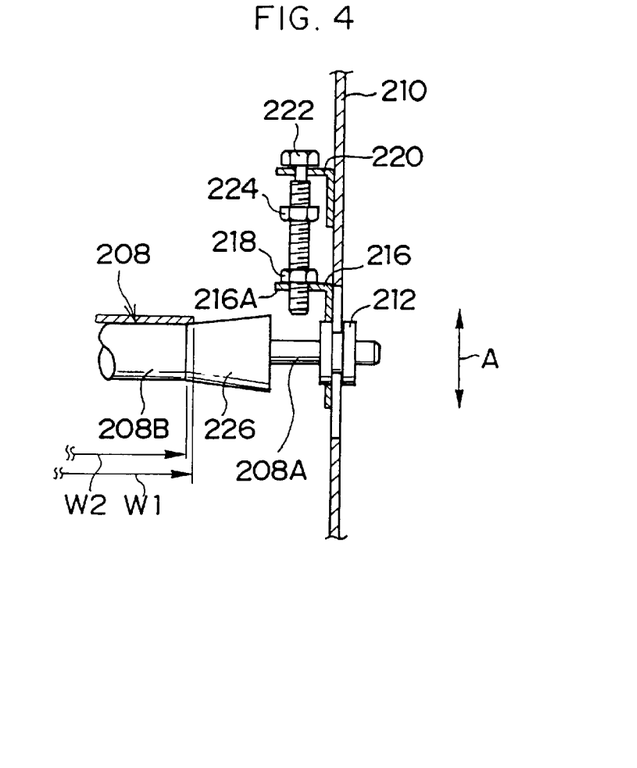
FIG. 4 is a cross-sectional view of FIG. 3, cut along the line 4—4 of FIG. 3.

As shown in FIG. 4, a substantially L-shaped bracket 216, which forms a portion of a moving means, is attached at each of the bearings 212 that support the shaft of the roller 208. A nut 218 is welded at a protruding portion 216A, which protrudes toward the inside of the side plate 210. A bolt 222 is screwed into the nut 218 and the protruding portion 216A. The bolt 222 is supported at the side plate 210 via a bracket 220 and forms a portion of the moving means together with the bracket 216. The bolt 222 can axially rotate, but movement in the axial direction is prevented. Accordingly, by rotating the bolt 222, the position of the bearing 212 can be moved within the elongated hole 214.

The axial line of the roller 208 is inclined when the position of the bearing 212 is moved. However, this inclination balances the difference in tension applied at the two end portions of the belt 86, so as to make the tension at the two end portions equal.

Accordingly, both ends of the rotational shaft 208A of the roller 208 can move independently, in the directions of arrow A in FIGS. 3 and 4.

The bolt 222 is screwed into a fixing nut 224, as positioning- and fixing-means beneath the bracket 220. By screwing the nut 224 at a predetermined position in a direction towards contacting the bracket 220, rotation of the bolt 222 is prevented, and the position of the bearing 212 can be fixed at a predetermined position.

According to the above-described structure, inclination of the roller 208 can be limited to a direction in which tension of the belt 86 can be reduced or increased, rather than a direction in which the belt 86 is conveyed. The belt 86 can be pulled in a direction in which tension of the belt 86 increases (direction of arrow B in FIG. 5B). Accordingly, in cases where the belt would otherwise move sideways, the sideways movement can be prevented beforehand by inclining the roller 208 so as to increase tension of the belt at a side of the shaft end in the direction opposite to the direction of the sideways movement.

As shown in FIG. 3, all of the rollers except for the rollers 200, 203 (the rollers 200 and 203 being at positions at which winding of the photosensitive material 16 and the image receiving paper 40 begins and ends, respectively), namely, the rollers 204, 206, 208 have roller portions 204B, 206B, 208B, respectively. The roller portions 204B, 206B, 208B are of a length corresponding to the transverse dimension of the belt 86. Auxiliary rollers 226 are axially supported at each of rotational shafts 204A, 206A, 208A, which are positioned at exterior sides of the roller portions 204B, 206B, 208B, respectively.

At the end surfaces of the roller portions 204B, 206B, 208B, the auxiliary rollers 226 have the same diameter as the roller portions 204B, 206B, 208B, respectively. The diameter of the auxiliary roller 226 gradually increases towards the shaft end side thereof. In other words, the auxiliary roller 226 is of a so-called tapered form. The auxiliary rollers 226 can rotate relatively to the driven rollers 204, 206, 208, which are the base bodies thereof. Ordinarily (in a state in which the belt is conveyed without moving sideways), the auxiliary rollers 226 do not interfere with the belt 86.

Figures 5A, 5B:
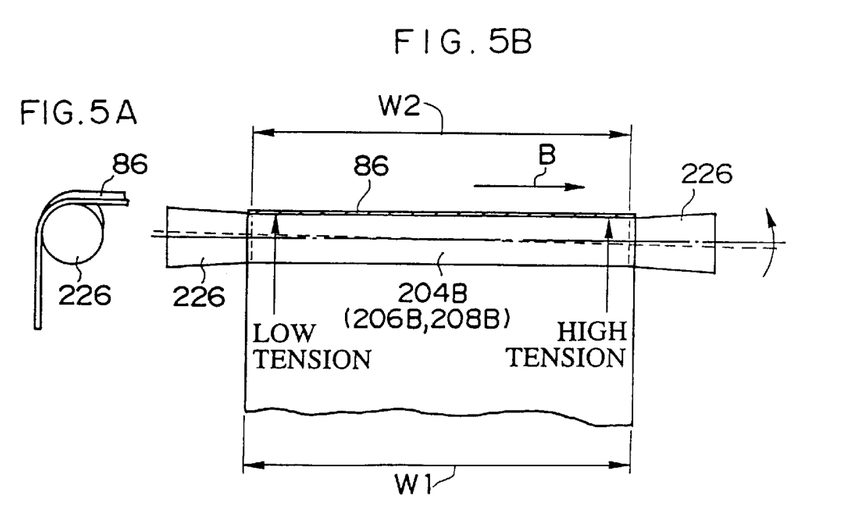
FIG. 5A is a front view as seen from the direction of an end surface of a driven roller, showing a state in which the driven roller is in an inclined axial-line state.
FIG. 5B is a right side view showing a state in which the axial line of the driven roller is inclined.

Namely, as shown in FIGS. 4 and 5, when the width of the belt 86 is indicated by W1 and the length of the driven rollers 204, 206, and 208 in the axial direction is indicated by W2, W1=W2 in the present embodiment. Accordingly, when sideways movement of the belt 86 occurs, the belt 86 moves onto the auxiliary rollers 226. Due to force conveying the belt 86 that has moved on the auxiliary rollers 226, the auxiliary rollers 226 rotate. However, the auxiliary rollers 226 are not moved in the axial direction by this conveying force.

Since the auxiliary rollers 226 are each in a tapered form, the linear speed of an end of the belt 86 in the transverse direction becomes greater, and the linear speed towards a central portion of the belt becomes less. The end of the belt 86 in the transverse direction, which has a greater linear speed, moves ahead first, and the belt 86 is conveyed while being moved in the direction opposite to the sideways movement (direction of arrow C in FIG. 6). Accordingly, the sideways movement is corrected.

Figure 6:
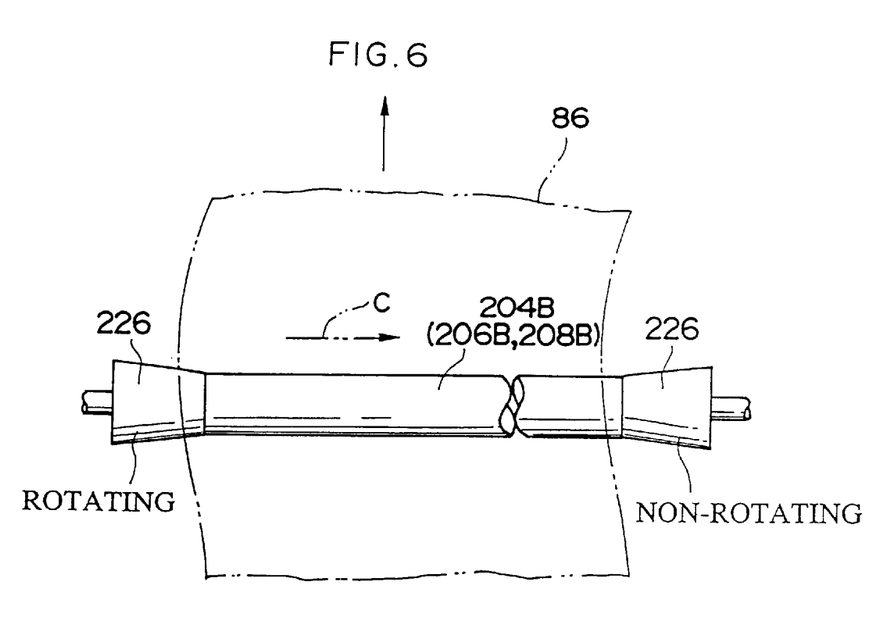
FIG. 6 is a plan view showing a state in which a belt has moved onto an auxiliary roller.

Further, the relationship between W1 and W2 may be W1≧W2. In this case, the same effects can be obtained in terms of inhibiting sideways movement even after the belt 86 moves onto the auxiliary rollers 226. However, from the standpoint of additionally considering the useful life of the belt 86, W1≈W2 is preferable.

Operation of the present embodiment will be explained next.

In the image exposure device 10, the photosensitive material 16 that has been loaded in the photosensitive material loading section 18 is conveyed to the exposure unit 24 by driving of conveying rollers (not shown). The photosensitive material 16 is scanned and exposed by light beams based on correction image data, in the exposure unit 24. The drum 78 in the form of an arc whose central angle is approximately 180° is disposed in the exposure unit 24. The photosensitive material 16 is wound at an inner circumferential surface of the drum 78 and conveyed, and light beams are irradiated onto the photosensitive material 16 from the inner circumferential direction of the drum 78.

The photosensitive material 16 is conveyed to the face section 26, which is disposed in a vicinity of the connecting portion at which the image processing device 12 and the image exposure device 10 are connected. Water is applied to the photosensitive material 16 at the water application section 80, which is part of the thermal development unit 28. Thereafter, the photosensitive material 16 is conveyed to the heating drum 84.

The heater 100 is contained in the heating drum 84. The temperature of the heater 100 rises as the heating drum 84 rotates. As a result, the photosensitive material 16 and the image receiving paper 40, which are being conveyed along the circumferential surface of the heating drum 84, are heated for a predetermined time, and an image is thereby formed on the image receiving paper 40.

After the photosensitive material 16 is stripped from the image receiving paper 40 by the photosensitive material-stripping member 88, the photosensitive material 16 is taken up by the take-up shaft 92 of the photosensitive material take-up section 30, and is disposed of as waste. Further, the image receiving paper 40 is stripped from the heating drum 84 by the image receiving paper-stripping member 90, and is discharged from the image processing device 12.

In cases where the photosensitive material 16 and the image receiving paper 40 are wound at the heating drum 84 and conveyed, they are pressed in the direction of the heating drum 84 by the belt 86, so as to promote adhesion and ensure that heat from the heating drum 84 is received reliably.

The belt 86 is wound about the roller group, and is conveyed by driving force of the roller 202 in synchronization with the heating drum 84.

The belt 86 may move sideways as it is conveyed. The amount by which the belt 86 moves sideways is in proportion to the transverse dimension of the belt 86. In the image forming apparatus 14 of the present embodiment, an original of a comparatively large size is used (for example, 841 mm×1189 mm, or 728 mm×1030 mm), and so a belt of a type having a large transverse dimension is used as the belt 86.

In the present embodiment, the inclination of the rotational axis of the roller 208 is adjusted before processing begins, in order to suppress sideways movement. The roller 208 is directly above the roller 200, which is disposed at a position at which winding of the photosensitive material 16 and the image receiving paper 40 on the heating drum 84 begins. Each of the bearings 212 which support the shaft of the rotating shaft 208 is mounted at the elongated hole 214 in the respective side plate 210, and is able to move along the respective elongated holes 214.

Namely, if the bolt 222 is rotated in a state in which the fixing bolt 224 has been loosened, the bracket 216 which is mounted to the bearing 212 moves. In conjunction with this movement, the bearing 212 can be made to move along the elongated hole 214.

The rotational shaft 208A is structured such that both end portions of the shaft 208A can be moved independently, and the direction of movement thereof is in a direction perpendicular to the rotational axis of the roller 208 and along a line connecting the center contact point of the wound dimension of the belt 86 wound on the roller 208 and the rotational axis of the roller 208. Accordingly, if the roller 208 is adjusted so as to be inclined, this inclination maintains the normal position of the belt 86 with respect to the direction to which the belt 86 is conveyed, and can change the degree of tension of the belt 86 independently, in the axial direction.

The belt 86 can be pulled in the direction in which the belt 86 has a higher tension, and by utilizing this operation, the belt 86 is adjusted so as to increase tension at an end of a shaft opposite to the direction of sideways movement, by rotating the bolt 222.

After adjustment is completed, rotation of the bolt 222 is prevented by tightening the fixing bolt 224. As a result, sideways movement of the belt 86 in the initial state can be improved, and the belt 86 can be conveyed in a normal state so long as there are no changes over time such as decreased elasticity of the belt 86, play of the roller group, or the like.

In cases where such changes over time or deviation from the initial adjustment position occur, sideways movement of the belt 86 occurs.

For such cases, the present embodiment is provided with the auxiliary roller 226 at each end portion in the axial direction of the rollers 204, 206, 208. These auxiliary rollers 226 are each in a tapered form wherein the diameter thereof increases gradually from the side end at the roller portions 204B, 206B, or 208B towards the shaft end side. The auxiliary rollers 226 do not ordinarily interfere with the belt 86.

When the belt 86 moves sideways, it moves from the roller portions 204B, 206B, 208B onto the auxiliary rollers 226. At this time, the side end portion of the belt 86 contacts the portion of the circumferential surface of the auxiliary roller 226 with the greatest diameter, and so the linear speed of the end portion increases. Accordingly, a force operates on the belt 86 to move it towards the direction opposite the sideways movement. The belt 86 that has moved sideways is thereby promptly returned to its original, normal position.

In the present embodiment, when there is a tendency for the belt 86 to move sideways caused by tolerance when the components are assembled in the initial setting, the inclination in the axial direction of the driven roller can be changed after assembling the components, to adjust the degree of tension at both end portions in the transverse direction of the belt 86 wound at the driven roller. Accordingly, the tendency for the belt 86 to move sideways caused during assembly of the components can be corrected.

Further, when there are changes over time (reduced elasticity of the belt 86, changes in the positioned state of the rollers, or the like), sideways movement may occur during operation. However, in these cases, since the tapered auxiliary rollers 226 are attached at both end portions in the axial direction of the rollers 204, 206, 208 so as to be able to rotate relatively to their base body, (i.e., roller portions 204B, 206B, 208B), the belt 86 which has moved sideways onto the auxiliary rollers 226 can be promptly returned to its original position.

Further, in the present embodiment, adjustment of the inclination of the rotational axis is limited to the roller 208, which is directly above the roller 200 provided at the position at which winding of the photosensitive material 16 and the image receiving paper 40 on the heating drum 84 begins. This structure has been adopted since the amount wound at the roller is greatest (an amount corresponding to approximately 90°) among the roller group and since it is most sensitive to the degree of tension. However, an inclination adjusting mechanism may be provided at another driven roller, i.e., the driven roller 200, 202, or 204.

In the present invention, rollers comprising the driven roller and the auxiliary rollers in combination can be disposed successively. Accordingly, the belt can be returned to an appropriate position before sideways movement, which is caused by belt tension or the like, worsens.

Further, by setting the relationship between the width W1 of the belt and the axial direction length W2 of the driven roller provided with the auxiliary rollers to be W1≧W2, when the belt does not move sideways and is in a normal position, the auxiliary rollers do not interfere with the belt. However, when the belt moves sideways, force inhibiting the sideways movement (force returning the belt to its proper position) operates. Since the belt therefore does not need to be constantly restrained using excessive force, the use life of the belt is not shortened.

What is claimed is:

1. A belt conveying apparatus for rotating a belt entrained on a plurality of rollers, comprising:
    at least one driving roller among the plurality of rollers, for imparting rotational driving force to the belt;
    at least one driven roller among the plurality of rollers, which does not impart rotational driving force to the belt;
    auxiliary rollers attached to the at least one driven roller, which driven roller is a base body thereof, so as to be able to undergo rotation relative to the driven roller, the diameter of each of the auxiliary rollers gradually increasing from an end portion of the auxiliary roller at an end portion of the driven roller towards the other end portion of the auxiliary roller in the axial direction.

2. A belt conveying apparatus according to claim 1, wherein rollers each comprising the driven roller and the auxiliary rollers in combination are arranged in succession.

3. A belt conveying apparatus according to claim 1, wherein a relationship between a width W1 of the belt and an axial direction length W2 of the driven roller provided with the auxiliary rollers is W1≧W2.

4. A belt conveying apparatus according to claim 2, wherein a relationship between a width W1 of the belt and an axial direction length W2 of the driven roller provided with the auxiliary rollers is W1≧W2.

5. A belt conveying apparatus according to claim 1, further comprising:
    a driven roller-moving mechanism, which allows two end portions of the driven roller in the axial direction to move independently from each other in a direction perpendicular to a rotational axis of the driven roller and along a line connecting a center contact point of a wound dimension of the belt wound on the driven roller and the rotational axis of the driven roller; and
    a positioning- and fixing-mechanism, for positioning and fixing the two end portions of the driven roller in the axial direction at respective positions at which sideways movement of the belt is inhibited.

6. A belt conveying apparatus according to claim 2, wherein the auxiliary rollers rotate due to conveying force of the belt but are not movable in the axial direction of the rotational shaft.

7. A belt conveying apparatus according to claim 3, wherein the auxiliary rollers rotate due to conveying force of the belt but are not movable in the axial direction of the rotational shaft.

8. A belt conveying apparatus according to claim 5, wherein the driven roller-moving mechanism moves each of the two end portions of the driven roller in the axial direction so as to increase tension of the end portion of the belt at a side opposite to the transverse direction in which the belt moves.

9. A belt conveying apparatus according to claim 5, wherein the driven roller-moving mechanism comprises:
    a bearing for axially supporting a rotational shaft of the driven roller at a side plate;
    an elongated hole provided in the side plate and having a longitudinal axis along a moving direction, which allows the two end portions of the driven roller in the axial direction to be moved in the direction of the line; and
    a bearing-moving mechanism for moving the bearing in the direction of the longitudinal axis of the elongated hole.

10. A belt conveying apparatus for rotating a belt entrained on a plurality of rollers, comprising:
    at least one driving roller among the plurality of rollers, for imparting rotational driving force to the belt;
    at least one driven roller among the plurality of rollers, which does not impart rotational driving force to the belt;
    a driven roller-moving mechanism, which allows two end portions of the driven roller in the axial direction to move independently from each other in a direction perpendicular to a rotational axis of the driven roller and along a line connecting a center contact point of a wound dimension of the belt wound on the driven roller and the rotational axis of the driven roller; and a positioning- and fixing-mechanism, for positioning and fixing beforehand both ends portions of the belt in the axial direction at respective positions at which sideways movement of the belt is inhibited.

11. A belt conveying apparatus according to claim 10, wherein the driven roller-moving mechanism moves each of the two end portions of the driven roller in the axial direction so as to increase tension of the end portion of the belt at a side opposite to the transverse direction in which the belt moves.

12. A belt conveying apparatus according to claim 10, wherein the driven roller-moving mechanism comprises:

a bearing for axially supporting a rotational shaft of the driven roller at a side plate;

an elongated hole provided in the side plate and having a longitudinal axis along a moving direction, which allows the two end portions of the driven roller in the axial direction to be moved in the direction of the line; and a bearing-moving mechanism for moving the bearing in the direction of the longitudinal axis of the elongated hole.

13. An image-forming apparatus for forming an image on an image receiving material, by heating a photosensitive material upon which an image is recorded and the image receiving material to which the image recorded on the photosensitive material is to be transferred, which the photosensitive material and the image receiving material have been laminated together in presence of a solvent for image formation, thereby transferring the image on the photosensitive material to the image receiving material, the image forming apparatus comprising:

a heating drum at whose circumferential surface the photosensitive material and the image receiving material which have been laminated together are wound, the circumferential surface of the heating drum being heated by heat from a heating source;

an endless belt for holding against the heating drum the photosensitive material and the image receiving material which have been laminated together, by moving along a portion of the circumferential surface of the heating drum as a portion of a conveying path, the endless belt being entrained and rotated at a plurality of rollers at a position including both end portions of the portion of the circumferential surface of the heating drum and at a different position from the position of the portion of the conveying path;

at least one driving roller among the plurality of rollers, for imparting rotational driving force to the belt;

at least one driven roller among the plurality of rollers, which does not impart rotational driving force to the belt;

auxiliary rollers attached to the at least one driven roller, which driven roller is a base body thereof, at two positions further outward than two transverse direction end portions of the entrained belt so as to be able to undergo rotation relative to the driven roller, the diameter of each of the auxiliary rollers gradually increasing from an end portion of the auxiliary roller at a transverse direction end portion of the belt when the belt is in a normal position towards the other end portion of the auxiliary roller in the axial direction.

14. An image forming apparatus according to claim 13, wherein rollers each comprising the driven roller and the auxiliary rollers in combination are arranged in succession.

15. An image forming apparatus according to claim 14, further comprising:

a driven roller-moving mechanism, which allows two end portions of the driven roller in the axial direction to move independently from each other in a direction perpendicular to a rotational axis of the driven roller and along a line connecting a center contact point of a wound dimension of the belt wound on the driven roller and the rotational axis of the driven roller; and a positioning- and fixing-mechanism, for positioning and fixing the two end portions of the driven roller in the axial direction at respective positions at which sideways movement of the belt is inhibited.

16. An image forming apparatus according to claim 15, wherein the auxiliary rollers rotate due to conveying force of the belt but are not movable in the axial direction of the rotational shaft.

17. An image-forming apparatus for forming an image on an image receiving material, by heating a photosensitive material upon which an image is recorded and the image receiving material to which the image recorded on the photosensitive material is to be transferred, which the photosensitive material and the image receiving material have been laminated together in the presence of a solvent for image formation, thereby transferring the image on the photosensitive material to the image receiving material, the image forming apparatus comprising:

a heating drum at whose circumferential surface the photosensitive material and the image receiving material which have been laminated together are wound, the circumferential surface of the heating drum being heated by heat from a heating source;

an endless belt for holding against the heating drum the photosensitive material and the image receiving material which have been laminated together, by moving along a portion of the circumferential surface of the heating drum as a portion of a conveying path, the endless belt being entrained and rotated at a plurality of rollers at a position including both end portions of the portion of the circumferential surface of the heating drum and at a different position from the position of the portion of the conveying path;

at least one driving roller among the plurality of rollers, for imparting rotational driving force to the belt;

at least one driven roller among the plurality of rollers, which does not impart rotational driving force to the belt;

a driven roller-moving mechanism, which allows two end portions of the driven roller in the axial direction to move independently from each other in a direction perpendicular to a rotational axis of the driven roller and along a line connecting a center contact point of a wound dimension of the belt wound on the driven roller and the rotational axis of the driven roller; and a positioning- and fixing-mechanism positioning and fixing the two end portions of the driven roller in the axial direction at respective positions at which sideways movement of the belt is inhibited.

18. An image forming apparatus according to claim 17, wherein rollers each comprising the driven roller and the auxiliary rollers in combination are arranged in succession.

19. An image forming apparatus according to claim 18, wherein the driven roller-moving mechanism moves each of the two end portions of the driven roller in the axial direction so as to increase tension of the end portion of the belt at a side opposite to the transverse direction in which the belt moves.

20. An image forming apparatus according to claim 18, wherein the driven roller-moving mechanism comprises:

a bearing for axially supporting a rotational shaft of the driven roller at a side plate;

an elongated hole provided in the side plate and having a longitudinal axis along a moving direction, which allows the two end portions of the driven roller in the axial direction to be moved in the direction of the line; and a bearing-moving mechanism for moving the bearing in the direction of the longitudinal axis of the elongated hole.

* * * * *